(12) United States Patent
Chen et al.

(10) Patent No.: US 8,973,940 B2
(45) Date of Patent: Mar. 10, 2015

(54) FOLDING WAGON

(71) Applicants: Zhaosheng Chen, El Monte, CA (US); Yishun Chen, El Monte, CA (US)

(72) Inventors: Zhaosheng Chen, El Monte, CA (US); Yishun Chen, El Monte, CA (US)

( * ) Notice: Subject to any disclaimer, the term of this patent is extended or adjusted under 35 U.S.C. 154(b) by 0 days.

(21) Appl. No.: 13/959,078

(22) Filed: Aug. 5, 2013

(65) Prior Publication Data

US 2015/0035258 A1 Feb. 5, 2015

(51) Int. Cl.
*B62B 3/02* (2006.01)

(52) U.S. Cl.
CPC ........................................ *B62B 3/02* (2013.01)
USPC ............. 280/639; 280/638; 280/35; 280/659; 280/651

(58) Field of Classification Search
CPC ........................................................ B62B 3/20
USPC ............................ 280/638, 639, 659, 35, 651
See application file for complete search history.

(56) References Cited

U.S. PATENT DOCUMENTS

| 4,826,187 A * | 5/1989 | Abbott et al. .................... 280/35 |
| 2010/0156069 A1* | 6/2010 | Chen .............................. 280/639 |
| 2011/0089671 A1* | 4/2011 | Baatz et al. .................... 280/651 |

* cited by examiner

*Primary Examiner* — Hau Phan
*Assistant Examiner* — Bryan Evans
(74) *Attorney, Agent, or Firm* — Clement Cheng

(57) ABSTRACT

The present invention is a wagon that can be folded along a middle plane that bisects the wagon between a front and rear portion. The folding wagon comprises of wheels, a folding frame, a support structure, a front panel a handle connected to the frame, wheels, and a bag hanger that are detailed herein. The folding frame includes a top rail formed of a top rail front portion and a top rail rear portion, a middle rail formed of a middle rail front portion and a middle rail rear portion, a bottom rail formed of a bottom rail front portion and a bottom rail rear portion. The top rail, the middle rail, and the bottom rail are connected by a hinge means. The top rail front portion is mounted to the top rail rear portion.

18 Claims, 7 Drawing Sheets

FOLDING WAGON

FIELD OF THE INVENTION

The present invention is in the field of folding wagons.

DISCUSSION OF RELATED ART

Folding wagons have become popular for carrying supplies to outdoor events such as picnics. Improving upon the traditional pull wagon is Zhaosheng Chen and Yishun Chen's previous U.S. Pat. No. 8,011,686 issued on Sep. 6, 2011 for a folding wagon, the disclosure of which is incorporated herein by reference. The previous wagon had a folding frame, which allows for it to be stowed away in places with limited area, such as the inside of a car trunk. The wagon included foldable side frames, a handle yoke to pull said wagon, four wheels, and a removable fabric canopy top. Fabric also lined the side within the wagon. When fully assembled the wagon provided shade from the sun, a seating area, and a fabric bag to store more items if necessary. Folding wagons can be constructed in a wide variety of different ways to make them lighter, stronger or easier to use.

SUMMARY OF THE INVENTION

The present invention is a wagon that can be folded along a middle plane that bisects the wagon between a front and rear portion. The folding wagon comprises of wheels, a folding frame, a support structure, a front panel a handle connected to the frame, wheels, and a bag hanger that are detailed herein.

The folding frame includes a top rail formed of a top rail front portion and a top rail rear portion, a middle rail formed of a middle rail front portion and a middle rail rear portion, a bottom rail formed of a bottom rail front portion and a bottom rail rear portion. The top rail, the middle rail, and the bottom rail are connected by a hinge means. The top rail front portion is mounted to the top rail rear portion. The top rail rear portion is mounted to the rear of the top rail front portion. A middle rail front portion is mounted below the top rail front portion. The middle rail rear portion is mounted below the top rail rear portion. The bottom rail front portion is mounted below the middle rail front portion. The bottom rail rear portion is mounted below the middle rail rear portion. The top rail front portion, the top rail rear portion, middle rail front portion, the middle rail rear portion, the bottom rail front portion, and the bottom rail rear portion are within 20° of being horizontally oriented. The rear frame is connected to the top rail at a rear frame upper joint. The front frame is connected to the top rail at a front frame upper joint. The rear frame is connected to the first middle rail at a rear frame first intermediate joint. The front frame is connected to the first middle rail at a front frame first intermediate joint. The rear frame is connected to the second middle rail at a rear frame intermediate joint. The front frame is connected to the second middle rail at a front frame second intermediate joint. The rear frame is connected to the bottom rail at a rear frame bottom joint. The front frame is connected to the bottom rail at a front frame bottom joint.

The support structure for the folding frame includes a front support, a middle support, and a rear support. The front support is connected to a support hinge. The rear support is also connected to the support hinge. The support hinge has a front support hinge for connecting the support hinge to the front support. The support hinge also has a rear support hinge for connecting the support hinge to the rear support. The front support is angled forward from the support hinge, while the rear support is angled backward from the support hinge. The middle support connects to the support hinge at an engagable connection that is configured to be engaged during an engaged state and disengaged during a disengaged state. The middle support is pivotally connected to the top rail, the middle rail and the bottom rail.

The engageable connection is formed as a support latch, and further including a support latch hinge upon which the support latch is pivotally mounted, and further including a spring that is installed to bias the support latch into a latched position. The support latch has a disengaged position that disengages from a lower end of the middle support from the support hinge, when the support latch is in the disengaged position.

The folding wagon's front panel is connected to the bottom rail front portion, while a rear panel also exists and is connected to the bottom rail rear portion. The wagon has a deployed position and a folded position. The front panel and rear panel are formed of a wire grid construction that is rectangular in shape, and welded to the bottom rail. The front support has a front support upper end connected to the top rail at a front support top joint. The rear support has a rear support upper end connected to the top rail at a rear support top joint. The top rail is formed as a pair of bended tubular metal members in a U shape. The middle rail is formed as a pair of bended tubular metal members in a U shape. The bottom rail is formed as a pair of bended tubular metal members in a U shape.

The aforementioned folding wagon further consists of a handle connected to the frame, wheels, and a bag hanger. The front wheels are steerable, but the rear wheels are fixed. The bag hanger is formed on a rear portion of the top rail. The bag hanger is formed as a loop, and further including a bag base formed on a rear portion of the bottom rail.

The following call out list of elements can be a useful guide in referencing the element numbers of the drawings.
21 Handle
22 Handle Extension
23 Handle Hinge
24 Handle Clip
25 Wheel Swivel
26 Wheel Truck
27 Wheel
31 Top Rail
32 First Middle Rail
33 Second Middle Rail
34 Bottom Rail
35 Bag Hanger
36 Bag Base
42 Front Support
43 Middle Support
44 Rear Support
45 Support Latch
46 Front Support Hinge
47 Rear Support Hinge 48 Front Support Top Joint
49 Rear Support Top Joint
50 Bracket Hinge Means
51 Bracket First Middle Hinge
52 Bracket Second Middle Hinge
53 Bracket Top Hinge
54 Rear Panel
55 Front Panel
56 Bracket Bottom Hinge
61 Rear Frame
62 Front Frame
63 Rear Frame Upper Joint
64 Front Frame Upper Joint
65 Rear Frame First Intermediate Joint
66 Front Frame First Intermediate Joint
67 Rear Frame Second Intermediate Joint
68 Front Frame Second Intermediate Joint
69 Rear Frame Bottom Joint
70 Front Frame Bottom Joint
71 Middle Support Upper Rear Joint
72 Middle Support Upper Front Joint
73 Middle Support First Intermediate Rear Joint
74 Middle Support First Intermediate Front Joint
75 Middle Support Second Intermediate Rear Joint
76 Middle Support Second Intermediate Front Joint
77 Middle Support Bottom Rear Joint
78 Middle Support Bottom Front Joint
79 Support Latch Hinge

DETAILED DESCRIPTION OF THE PREFERRED EMBODIMENT

Figure 1:
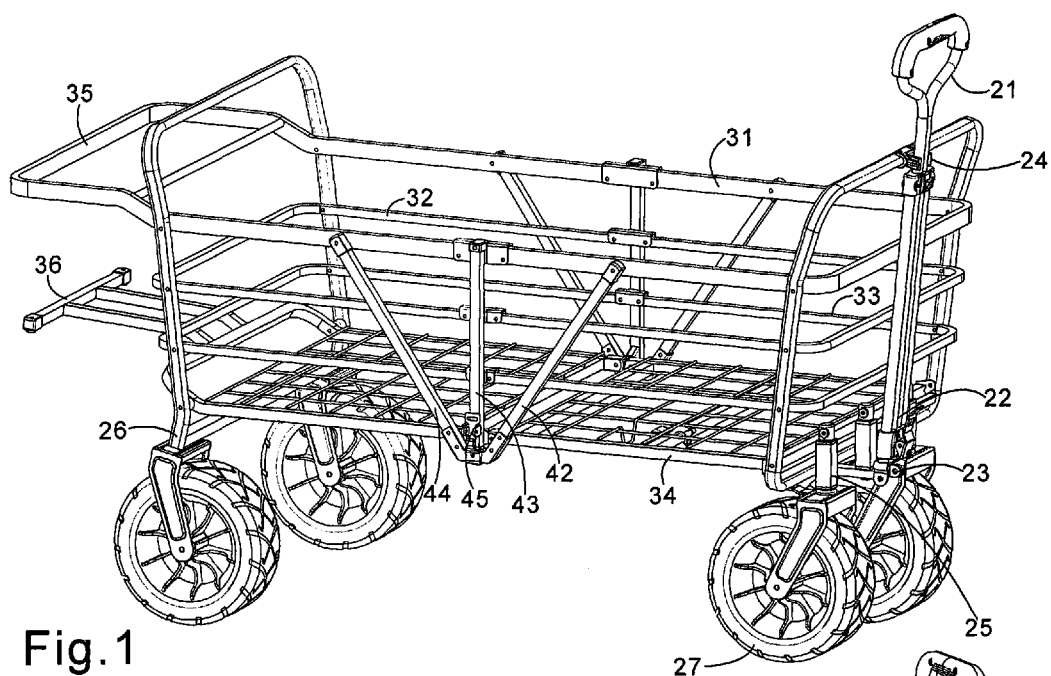
FIG. 1 is a right side perspective view of the folding wagon.
Figure 2:
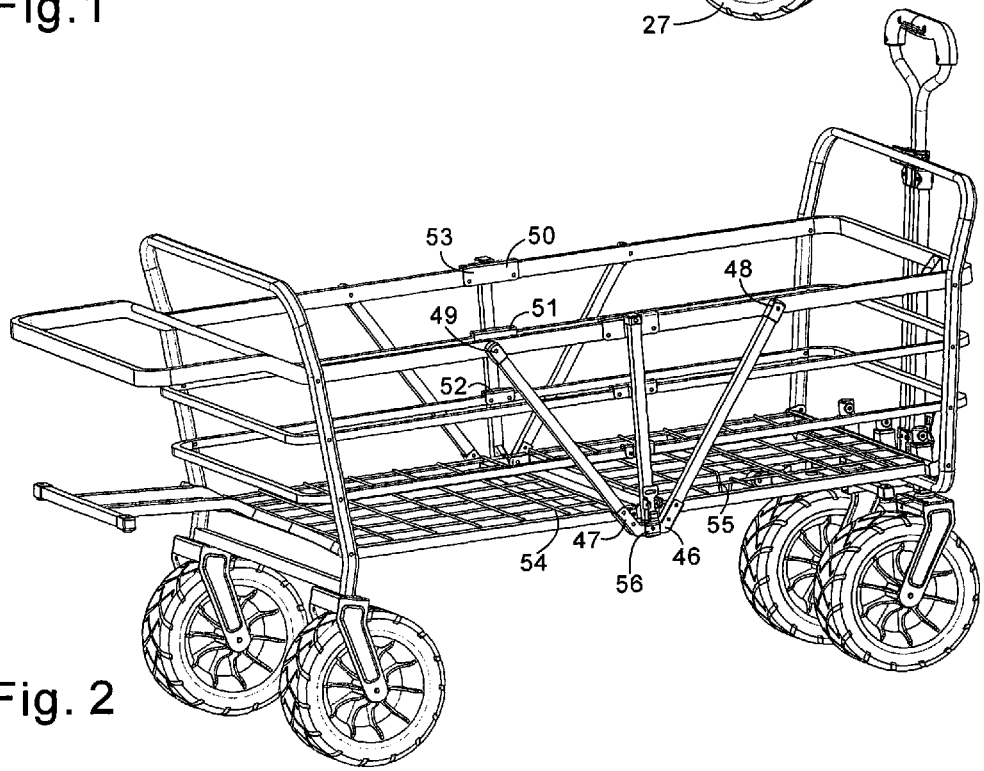
FIG. 2 is a left side perspective view of the folding wagon.
Figure 3:
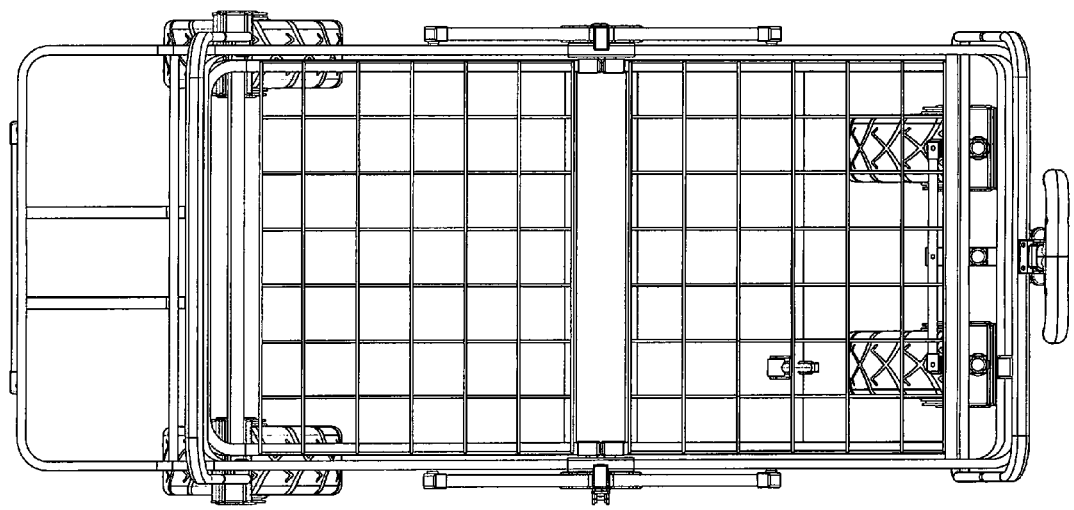
FIG. 3 is a top view of the wagon.
Figure 4:
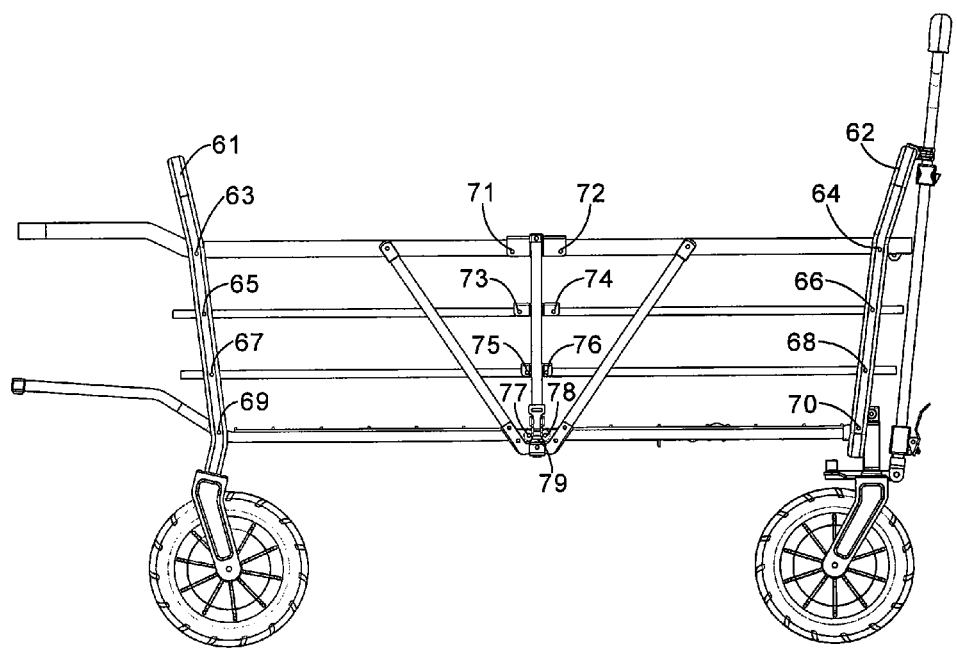
FIG. 4 is a side view of the wagon.
Figure 5:
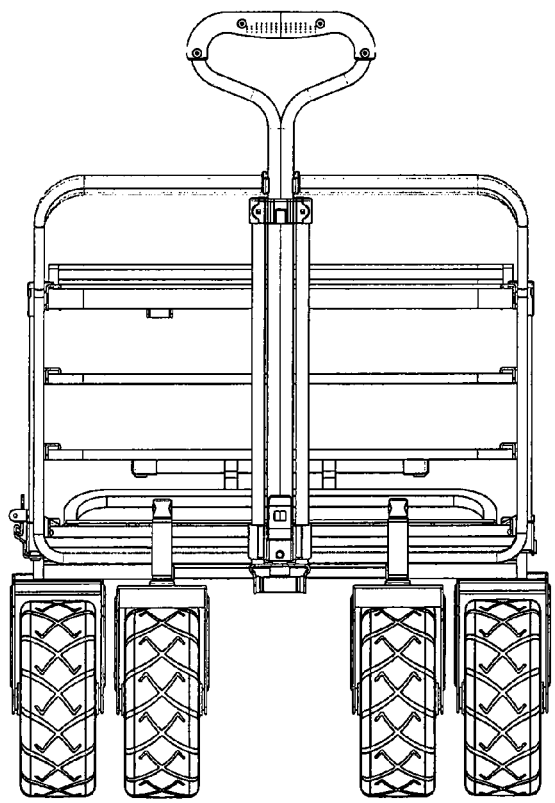
FIG. 5 is a front view of the wagon.
Figure 6:
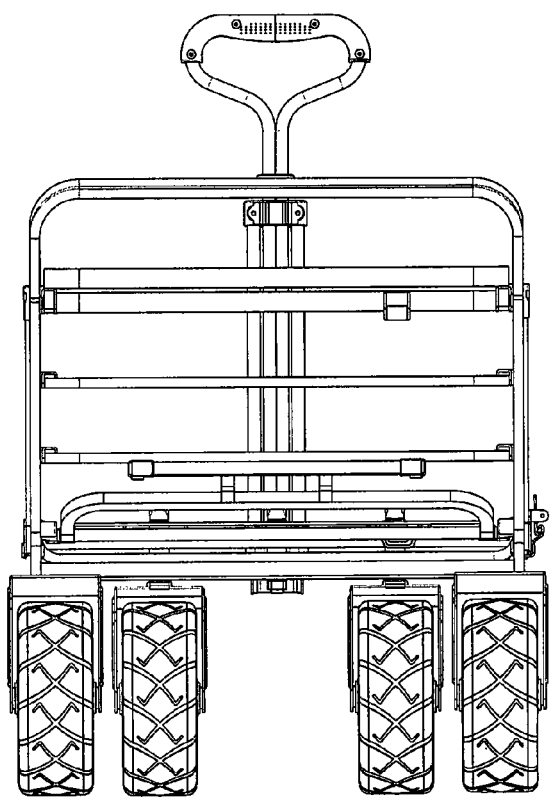
FIG. 6 is a rear view of the wagon.
Figure 7:
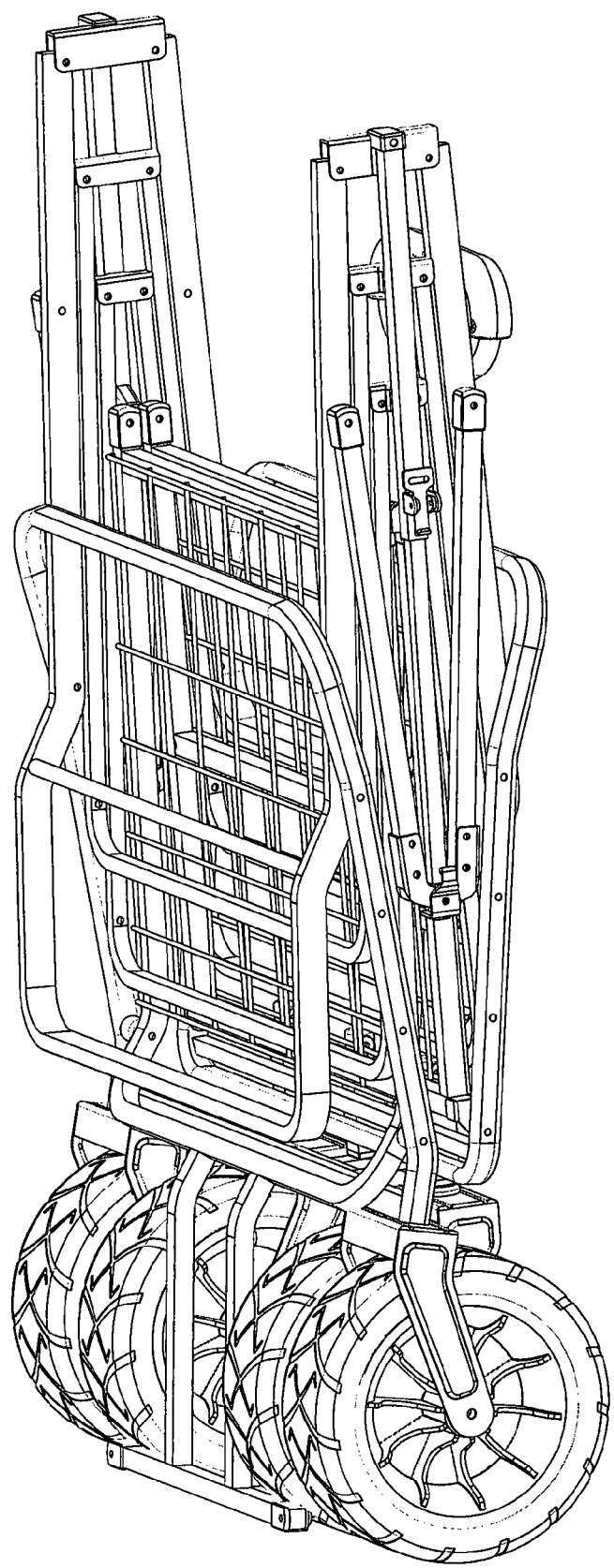
FIG. 7 is a perspective rear view of the folded wagon.
Figure 8:
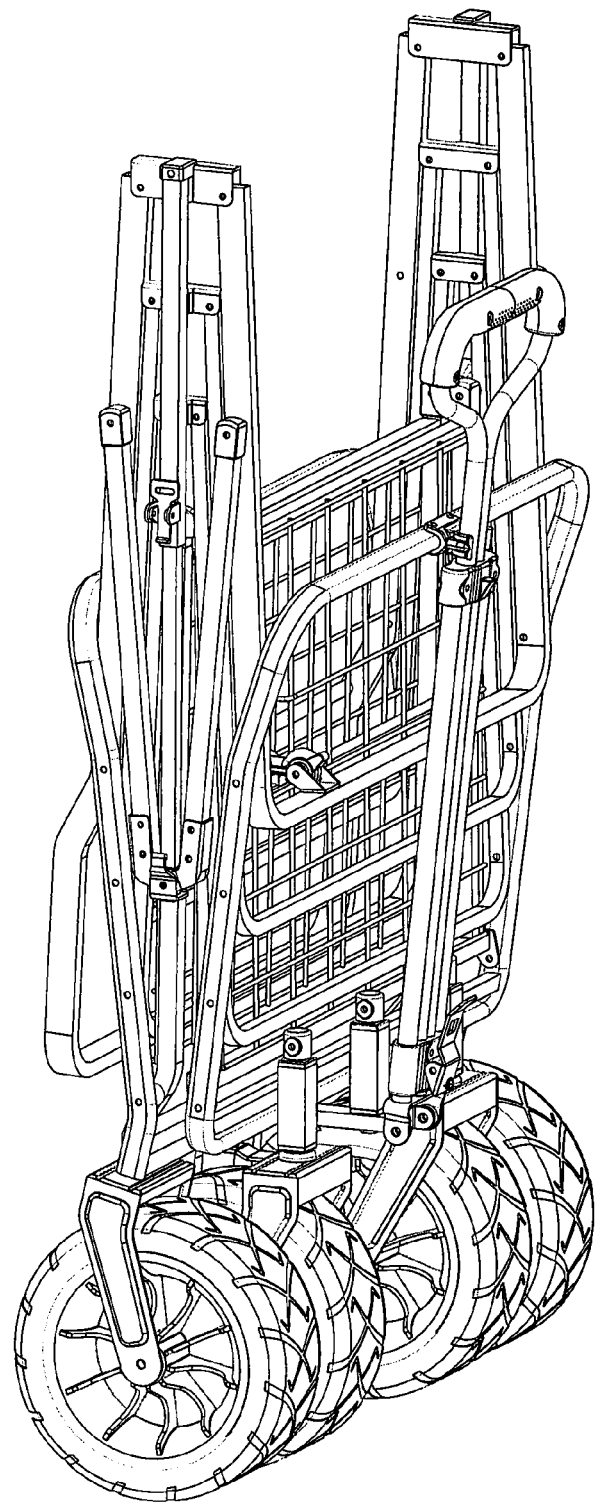
FIG. 8 is a perspective front view of the folded wagon.
Figure 9:
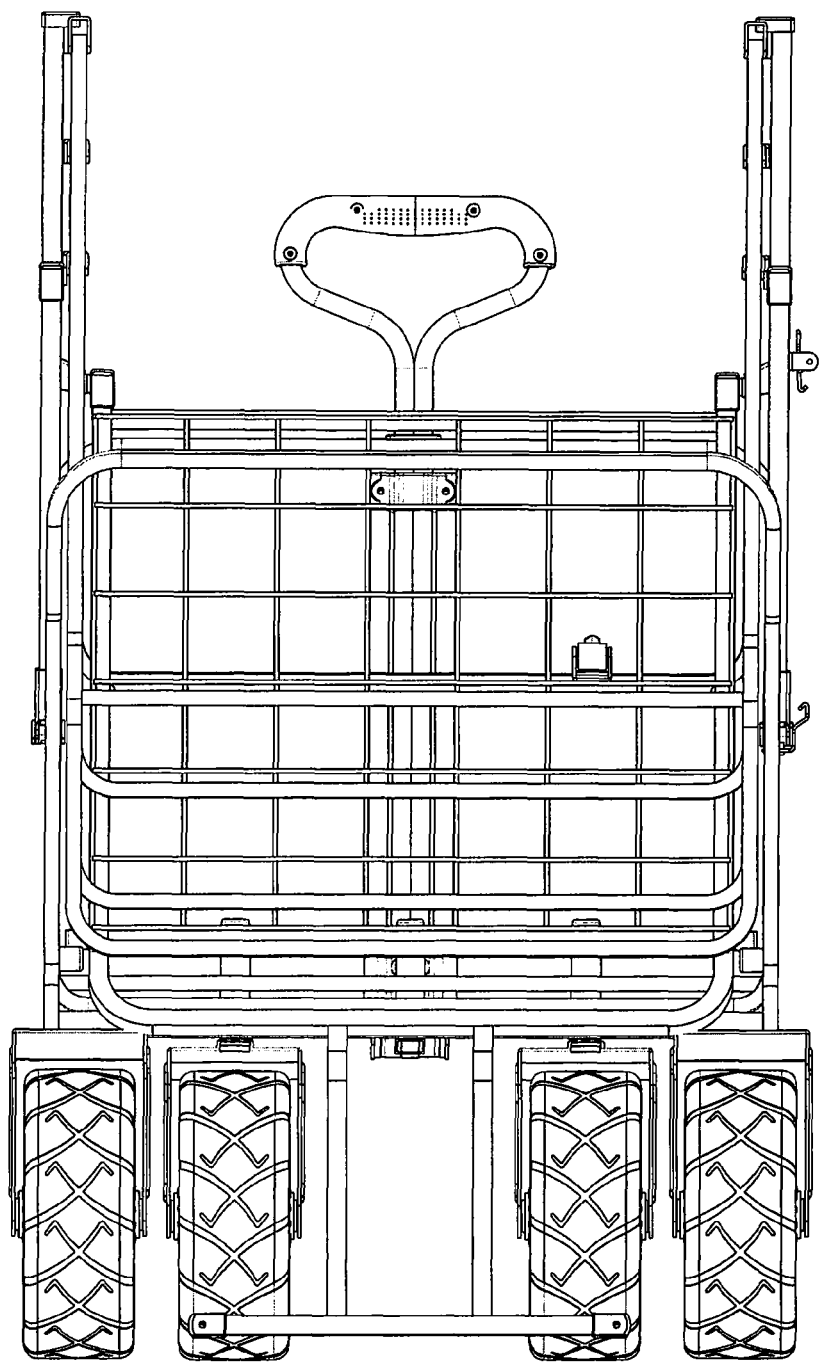
FIG. 9 is a rear view of the folded wagon.
Figure 10:
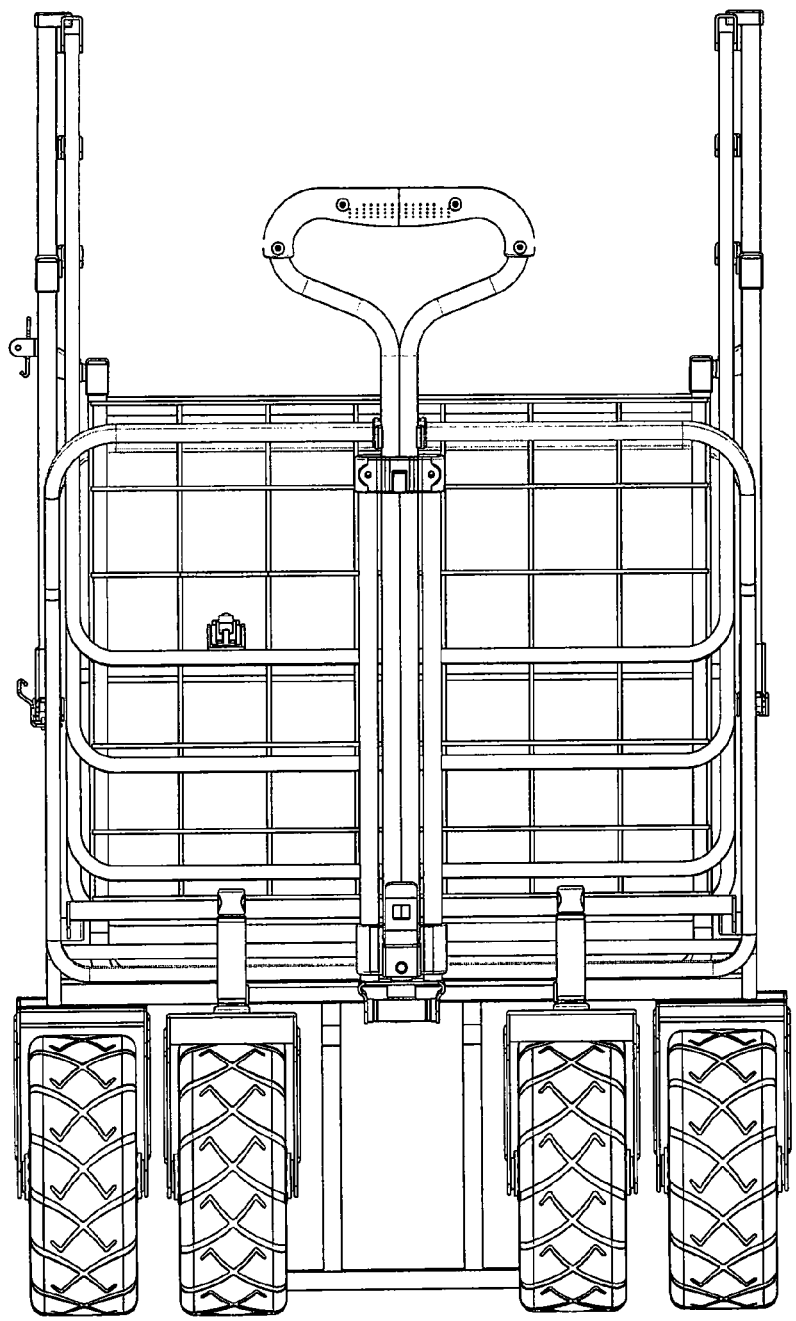
FIG. 10 is a front view of the folded wagon.

According to FIGS. 1, 2, the present invention is a wagon that can be folded along a middle plane that bisects the wagon between a front and rear portion. The wagon has a number of wheels 27. The rear wheels are mounted on a real truck 26 and the front wheels are mounted on a pair of wheel swivels 25. The handle 21 is used to pull the wagon. The handle 21 has a handle extension 22 from which it can telescopically extend. The handle extension is preferably made of three tubular members, with the middle member retaining the handle 21 partially within the handle extension. The handle hinge 23 allows the handle to raise and lower in an arc shaped path during normal usage. The handle hinge is mounted to an extension that is connected to a frame portion of the wagon at a lower portion of the wagon.

The primary frame generally includes four rails including: a top rail 31, a first middle rail 32 below the top rail, a second middle rail 33 below the first middle rail 32, and a bottom rail 34 below the second middle rail 33. The four rails each have a front section and a rear section. The rear section of the top rail extends to a bag hanger 35 which can form a hoop extending beyond a rear frame of the wagon. The bag base 36 preferably extends from a bottom rail. The bag hanger can receive a carry bag and the bag base 36 can support the bottom of the carry bag. The carry bag that can be made of fabric that is fit over the bag hanger frame. For clarity, the fabric portion is not shown in the drawings.

The frame further includes a front support 42, a middle support 43, and a rear support 44 can support a middle portion of the frame. The front support 42 is mounted to a front top rail 31, and the rear support 44 is mounted to a rear top rail 31. The rear support 44 angles backward at approximately a 60° angle, and the front support 42 angles forward at approximately a 60° angle from horizontal. The middle support 43 preferably is vertical. The front support and rear support come together to form a seat connection to receive a bottom end of the middle support. The bottom end of the middle support abuts the seat connection formed by the front and rear support. The seat connection can be formed as a support latch 45. The support latch 45 can be automatically latching so that the support latch automatically engages when the bottom end of the middle support abuts the seat formed by the front and rear support. The support latch automatically engages when the wagon is unfolded. The support latch needs to be manually disengaged when a user is folding the wagon. The wagon folds by raising the middle support 43 away from the seat connection where the latch is formed near the seat connection. The support latch 45 can be mounted on a rotating support latch hinge 79 and biased with a spring so that the support latch 45 rotates on the support latch hinge 79 to a closed position automatically.

The front support and rear support are hinged to each other at a front support hinge 46 and a rear support hinge 47. The front support hinge folds from its unfolded angle to a vertical angle of the front support. The rear support hinge folds from its unfolded angle to a vertical angle of the rear support. When folded, the wagon middle support rises and the front support and rear support fold to become parallel in vertical position. The front support top joint 48 and rear support top joint 49 are respectively connected to the top rail 31.

The top rail 31 and the remainder of the rails are all hinged by a bracket hinge means 50. The bracket hinge means 50 includes a bracket first middle hinge 51. The bracket first middle hinge 51 connects the first middle rail rear portion to the first middle rail front portion. The bracket second middle hinge 52 connects the front and rear portions of the second middle rail 33. The bracket top hinge 53 connects the front and rear portions of the top rail 31. The bracket bottom hinge 56 connects the front and rear portions of the bottom rail 34. The bracket first middle hinge 51, bracket second middle hinge 52, bracket top hinge 53, and bracket bottom hinge 56 are all preferably made of a sheet of metal that is folded to form a bracket allowing a rail member to fold from a horizontal deployed position to a vertical stowed position. The bracket prevents movement of the rail member past a horizontal deployed position when the wagon is in use.

The front portion of the top rail 31 is connected to the bracket top hinge 53 at a middle support upper front joint 71. The rear portion of the top rail 31 is connected to the bracket top hinge 53 at a middle support upper rear joint 71. The front portion of the first middle rail 32 is connected to the bracket first middle hinge 51 at the middle support first intermediate front joint 74. The rear portion of the first middle rail 32 is connected to the bracket first middle hinge 51 at the middle support first intermediate rear joint 73. The front portion of the second middle rail 33 is connected to the bracket second middle hinge 52 at the middle support second intermediate front joint 76. The rear portion of the second middle rail 33 is connected to the bracket second middle hinge 52 at the middle support second intermediate rear joint 75. The front portion of the bottom rail 34 is connected to the bottom hinge 53 at the middle support bottom front joint 78. The rear portion of the bottom rail 34 is connected to the bottom hinge 53 at the middle support bottom rear joint 77.

The bottom rail 34 has a front portion that retains a front panel 55 and has a rear portion that retains a rear panel 54. The front panel 55 and the rear panel 54 can be formed of a wire grid that is welded together and welded to the bottom rail 34. Heavy gauge wire can be used for forming a wire grid. The wire grid is preferably of sufficiently thick wire that deformation is not probable given likely loads. The rails and the wire grid are horizontally oriented, which means that they are substantially horizontally oriented. Substantially horizontally oriented means the member is formed in a direction that is more horizontal than 45° diagonal. Preferably, the horizontally oriented members are within 20° of being horizontal. A middle cross member can be connected between the pair of support hinges, namely between the left support hinge and the right support hinge. A front cross member can connect the lower ends of the front frame.

The rear frame 61 can be formed in a U-shaped metal bend similar to the front portion of the top rail 31 and the rear portion of the top rail 31. The U-shaped metal bend can also be used for forming the various rails of the frame, as well as the front frame 62. The rear frame 61 preferably has a pair of rounded top corners with a pair of bottom corners connected together at a wheel truck 26. The rear frame 61 is mounted toward a rear portion of the wagon holding area. The front frame 62 is mounted toward a front portion of the wagon holding area. Articles are stored in the wagon holding area.

The rear frame 61 is connected to the top rail 31 at the rear frame upper joint 63. The front frame 62 is connected to the top rail 31 and the front frame upper joint 64. The rear frame 61 is connected to the first middle rail 32 at the rear frame first intermediate joint 65. The front frame 62 is connected to the first middle rail 32 at the front frame first intermediate joint 66. The rear frame 61 is connected to the second middle rail 33 at the rear frame intermediate joint 67. The front frame is connected to the second middle rail 33 at the front frame second intermediate joint 68. The rear frame 61 is connected to the bottom rail 34 at the rear frame bottom joint 69. The front frame 62 is connected to the bottom rail 64 at the front frame bottom joint 70. The The rear frame upper joint 63, front frame upper joint 64, rear frame first intermediate joint 65, front frame first intermediate joint 66, rear frame second intermediate joint 67, front frame second intermediate joint 68, rear frame bottom joint 69, and 70 front frame bottom joint 70 can be formed as a pair of joints, namely a right joint and a left joint. The right joint is located on the right side of the wagon and the left joint would be located on the left side of the wagon. The joints can be implemented as a pair of joints. The joints can be implemented as a pin extending through the surface of a tube of steel or aluminum.

The invention claimed is:

1. A folding wagon comprising:
   a. wheels;
   b. a folding frame that includes: a top rail formed of a top rail front portion and a top rail rear portion; a middle rail formed of a middle rail front portion and a middle rail rear portion; a bottom rail formed of a bottom rail front portion and a bottom rail rear portion; wherein the top rail front portion is mounted to the top rail rear portion, wherein the top rail rear portion is mounted to the rear of the top rail front portion, wherein a middle rail front portion is mounted below the top rail front portion, wherein the middle rail rear portion is mounted below the top rail rear portion, wherein the bottom rail front portion is mounted below the middle rail front portion, and wherein the bottom rail rear portion is mounted below the middle rail rear portion; wherein the top rail front portion, the top rail rear portion, middle rail front portion, the middle rail rear portion, the bottom rail front portion, and the bottom rail rear portion are within 20° of being horizontally oriented;
   wherein a rear frame is connected to the top rail at a rear frame upper joint, wherein a front frame is connected to the top rail at a front frame upper joint, wherein the rear frame is connected to a first middle rail at a rear frame first intermediate joint, wherein the front frame is connected to the first middle rail at a front frame first intermediate joint, wherein the rear frame is connected to a second middle rail at a rear frame intermediate joint, wherein the front frame is connected to the second middle rail at a front frame second intermediate joint, wherein the rear frame is connected to the bottom rail at a rear frame bottom joint, wherein the front frame is connected to the bottom rail at a front frame bottom joint;
   c. a support structure for the folding frame including a front support, a middle support, and a rear support, wherein the front support is connected to a support hinge, wherein the rear support is also connected to the support hinge, wherein the support hinge has a front support hinge for connecting the support hinge to the front support, wherein the support hinge has a rear support hinge for connecting the support hinge to the rear support, wherein the front support is angled forward from the support hinge, wherein the rear support is angled backward from the support hinge, wherein the middle support connects to the support hinge at an engagable connection that is configured to be engaged during and engaged state and disengaged during a disengaged state; wherein the middle support is pivotally connected to the top rail, the middle rail and the bottom rail;
   d. a front panel connected to the bottom rail front portion, and a rear panel connected to the bottom rail rear portion; wherein the wagon has a deployed position and a folded position; and
   e. a bag base extending from the bottom rail, wherein the bag base supports a bottom of a carry bag when the wagon is in the deployed position, wherein the bag base folds down to provide a leg stand when the wagon is in the folded position.

2. The folding wagon of claim 1, further including a handle, wherein the handle is connected to the frame.

3. The folding wagon of claim 1, wherein the engageable connection is formed as a support latch, and further including a support latch hinge upon which the support latch is pivotally mounted, and further including a spring that is installed to bias the support latch into a latched position.

4. The folding wagon of claim 1, further including a bag hanger formed on a rear portion of the top rail, wherein the bag hanger is formed as a loop, and further including a bag base formed on a rear portion of the bottom rail.

5. The folding wagon of claim 1, wherein the front panel and the rear panel are formed of a wire grid construction that is rectangular in shape, and welded to the bottom rail.

6. The folding wagon of claim 1, wherein the front support has a front support upper end connected to the top rail at a front support top joint, wherein the rear support has a rear support upper end connected to the top rail at a rear support top joint.

7. The folding wagon of claim 1, wherein the top rail is formed as a pair of bended tubular metal members in a U shape, wherein the middle rail is formed as a pair of bended tubular metal members in a U shape, wherein the bottom rail is formed as a pair of bended tubular metal members in a U shape.

8. The folding wagon of claim 1, wherein the front wheels are steerable, but the rear wheels are fixed.

9. The folding wagon of claim 1, wherein the engageable connection is formed as a support latch, wherein the support latch has a disengaged position that disengages from a lower end of the middle support from the support hinge, when the support latch is in the disengaged position.

10. The folding wagon of claim 1, wherein the top rail, the middle rail, and the bottom rail are connected by a hinge means.

11. The folding wagon of claim 10, further including a handle, wherein the handle is connected to the frame.

12. The folding wagon of claim 10, wherein the engageable connection is formed as a support latch, and further including a support latch hinge upon which the support latch is pivotally mounted, and further including a spring that is installed to bias the support latch into a latched position.

13. The folding wagon of claim 10, further including a bag hanger formed on a rear portion of the top rail, wherein the bag hanger is formed as a loop, and further including a bag base formed on a rear portion of the bottom rail.

14. The folding wagon of claim 10, wherein the front panel and the rear panel are formed of a wire grid construction that is rectangular in shape, and welded to the bottom rail.

15. The folding wagon of claim 10, wherein the front support has a front support upper end connected to the top rail at a front support top joint, wherein the rear support has a rear support upper end connected to the top rail at a rear support top joint.

16. The folding wagon of claim 10, wherein the top rail is formed as a pair of bended tubular metal members in a U shape, wherein the middle rail is formed as a pair of bended tubular metal members in a U shape, wherein the bottom rail is formed as a pair of bended tubular metal members in a U shape.

17. The folding wagon of claim 10, wherein the front wheels are steerable, but the rear wheels are fixed.

18. The folding wagon of claim 10, wherein the engageable connection is formed as a support latch, wherein the support latch has a disengaged position that disengages from a lower end of the middle support from the support hinge, when the support latch is in the disengaged position.

* * * * *